United States Patent
Eichenberger et al.

[11] 3,882,161
[45] May 6, 1975

[54] BETA-PHENYLPROPIONIC ACIDS AND ESTERS

[75] Inventors: Kurt Eichenberger, Therwil; Christian Egli, Magden, both of Switzerland

[73] Assignee: Ciba-Geigy Corporation, Ardsley, N.Y.

[22] Filed: Apr. 5, 1971

[21] Appl. No.: 131,444

[30] Foreign Application Priority Data
Apr. 9, 1970  Switzerland.......................... 5273/70
July 16, 1970  Switzerland...................... 10817/70
Mar. 2, 1971  Switzerland......................... 3065/71

[52] U.S. Cl. . 260/471 A; 260/295.5 S; 260/501.11; 260/505 E; 260/513 R; 260/513.6; 260/519; 260/559 A; 424/266; 424/309; 424/319
[51] Int. Cl........................................... C07c 101/18
[58] Field of Search.......... 260/471 A, 519, 501.11, 260/295.5 S, 505 E, 513 K, 513.6

[56] References Cited
UNITED STATES PATENTS
3,553,197  1/1971  Grenda.............................. 260/519

*Primary Examiner*—Lorraine A. Weinberger
*Assistant Examiner*—L. A. Thaxton
*Attorney, Agent, or Firm*—Joseph G. Kolodny; Theodore O. Groeger; John J. Maitner

[57] ABSTRACT

Amines of the formula I

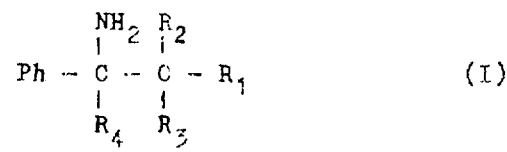

wherein Ph denotes a phenyl radical which is substituted by at least one aliphatic etherified hydroxyl group and optionally by amino groups, nitro groups, lower alkyl groups, trifluoromethyl groups and/or halogen atoms, $R_1$ denotes an optionally esterified or amidised carboxyl group, and each of the radicals $R_2$, $R_3$ and $R_4$, which can be identical or different, denotes a lower hydrocarbon radical of aliphate character or hydrogen, their antipodes and salts are useful as antihypertensive agents.

7 Claims, No Drawings

BETA-PHENYLPROPIONIC ACIDS AND ESTERS

The invention relates to new amines of formula I

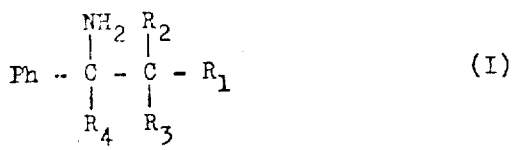

wherein Ph denotes a phenyl radical which is substituted by at least one aliphatic etherified hydroxyl group and optionally by amino groups, nitro groups, lower alkyl groups, trifluoromethyl groups and/or halogen atoms, $R_1$ denotes an optionally esterified or amidised carboxyl group and each of the radicals $R_2$, $R_3$ and $R_4$, which can be identical or different, denotes a lower hydrocarbon radical of aliphatic character or hydrogen, with the exception of DL-$\beta$-amino-$\beta$-(2-, -(3- or -(4-methoxyphenyl)-propionic acid, DL-$\beta$-amino-$\beta$-(3,4-methylenedioxyphenyl)-propionic acid, DL-$\beta$-amino-$\beta$-(2,4,-or (3,4-dimethoxyphenyl)-propionic acid, DL-$\beta$-amino-$\beta$-(3-fluoro-4-methoxyphenyl)-propionic acid, DL-$\beta$-amino-$\beta$-(2-chloro-3,4-dimethoxyphenyl)-propionic acid, DL-$\beta$-amino-$\beta$-(3,4-difluoro-4-methoxyphenyl)-propionic acid, DL-$\alpha$-methyl-, DL-$\alpha$-ethyl- and DL-$\alpha$-benzyl-$\beta$-amino-$\beta$-(3,4-methylenedioxyphenyl)-propionic acid, and DL-$\beta$-amino-$\beta$-(3-methoxyphenyl)-propionic acid ethyl ester as well as DL compounds of formula II

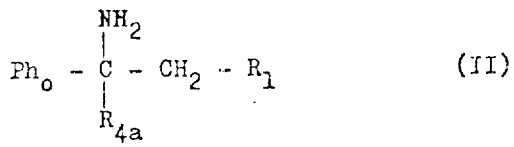

wherein $Ph_o$ represents the 4-methoxyphenyl or 4-ethoxyphenyl radical, $R_1$ has the above meanings and $R_{4a}$ represents a methyl, ethyl, propyl, isopropyl, n-butyl, isobutyl, cyclopropyl, cyclopentyl or cyclohexyl radical, as well as processes for their manufacture.

A phenyl radical Ph substituted by at least one aliphatic etherified hydroxyl group is for example a phenyl radical which displays one, two or more lower alkoxy radical(s), lower alkenyloxy radical(s), such as allyloxy and methallyloxy radicals, and/or a methylenedioxy radical and is optionally substituted further as mentioned above, with the possible lower alkoxy radicals being especially those which contain the lower alkyl radicals mentioned below, such as especially ethoxy and propoxy radicals and very especially methoxy radicals. Examples of such radicals Ph are 2-, 3- and 4-methoxyphenyl, 2,3-, 2,4-, 2,5-, 2,6- and 3,4- and 3,5-dimethoxyphenyl, 2,3- and 3,4-methylenedioxyphenyl, 2,3,4-, 3,4,5- and 2,4,6-trimethoxyphenyl radicals, 3-and 4-allyloxyphenyl radicals and 3- and 4-methallyloxyphenyl radicals which can optionally be further substituted as mentioned above. Amino groups are optionally substituted amino groups, and halogen atoms are above all those with a molecular weight of up to 80. A radical Ph can here contain two or more, but especially one, of these additional substituents, but above all displays none of these additional substituents.

Optionally substituted amino groups are especially free amino groups and also amino groups which are substituted by one or two hydrocarbon radicals of aliphatic character, such as those mentioned below, especially lower alkyl radicals, such as those mentioned below, such as for example methylamino, ethylamino, dimethylamino and diethylamino groups.

An optionally esterified or amidised carboxyl group $R_1$ is especially a free carboxyl group, and also an esterified or amidised carboxyl group. Esterified carboxyl groups are especially those which are esterified with an alcohol of formula $R_xOH$, wherein $R_x$ is a hydrocarbon radical of aliphatic character, especially those which are esterified with a lower alkanol, such as a lower alkanol corresponding to one of the lower alkyl radicals mentioned below, for example methanol and ethanol.

A hydrocarbon radical of aliphatic character is a radical of which the free bond starts from a C atom which is not a member of an aromatic system. Lower radicals are those which display up to 6 C atoms, and in the case of cyclic radicals or radicals with cyclic substituents, up to 12 C atoms.

Lower hydrocarbon radicals of aliphatic character are for example aliphatic, cycloaliphatic, cycloaliphaticaliphatic and araliphatic hydrocarbon radicals.

Aliphatic hydrocarbon radicals are for example lower alkyl radicals, such as methyl, ethyl, propyl and isopropyl radicals, straight and branched butyl, pentyl and hexyl radicals bonded in any desired position, as well as lower alkenyl radicals, such as vinyl, allyl and methallyl radicals.

Cycloaliphatic hydrocarbon radicals and cycloaliphatic parts of cycloaliphatic-aliphatic hydrocarbon radicals are for example optionally lower-alkylated radicals with 3–7, 7, especially 5–7, 7, ring members, such as cyclopropyl, cyclopentyl, cyclohexyl and cycloheptyl radicals.

Aliphatic parts of cycloaliphatic-aliphatic and araliphatic hydrocarbon radicals are especially lower alkyl radicals, such as those mentioned above. Examples of cycloaliphatic-aliphatic hydrocarbon radicals are cyclopentylmethyl, 2-cyclohexyl-ethyl and cycloheptyl-methyl radicals.

Araliphatic hydrocarbon radicals are especially phenyl-lower alkyl radicals, such as phenylethyl and benzyl radicals.

The compounds of the present invention display valuable pharmacological properties.

Thus they especially display anti-hypertensive effects, as can be shown in animal experiments, for example on renal hypertonic rats and dogs, in doses of about 10 to about 400 mg/kg s.c. or p.o. The compounds of the present invention are therefore above all useful as anti-hypertensive agents. The new compounds are however also valuable intermediate products for the manufacture of other useful substances, especially pharmaceutically active compounds.

Compounds to be particularly highlighted are amines of formula I wherein Ph has the above meaning, $R_1$ is an esterified or amidised carboxyl group, one of the radicals $R_2$ and $R_3$ represents a lower hydrocarbon radical of aliphatic character, especially lower alkyl, such as methyl, and the other has the above meaning, and especially represents hydrogen or lower alkyl, such as methyl, and $R_4$ represents hydrogen. Preferably, Ph here represents a tri- and especially a mono- or di-lower alkoxyphenyl radical, wherein the lower alkoxy parts in particular represent methoxy radicals, or methylenedioxyphenyl radical, wherein these phenyl radicals are optionally substituted by one or two fluorine, chlorine or bromine atoms or lower alkyl radicals, especially methyl radicals, but are above all unsubstituted.

Further, especially suitable compounds are amines of formula I wherein Ph represents a mono-, di- or tri-lower alkoxyphenyl radical, wherein the lower alkoxy parts especially represent methoxy radicals, or represents a 2,3- methylenedioxyphenyl radical, wherein these phenyl radicals are optionally substituted by one or two free, mono- or di- lower alkylated amino groups, such as methylamino and dimethylamino groups, nitro groups, trifluoromethyl groups, and especially fluorine, chlorine or bromine atoms or lower alkyl radicals, especially methyl radicals, but are above all unsubstituted, $R_1$ represents an esterified or amidised carboxyl group, but above all a free carboxyl group, one of the radicals $R_2$ and $R_3$ represents a lower hydrocarbon radical of aliphatic character, especially lower alkyl, such as methyl, and the other has the above meanings and especially represents hydrogen or lower alkyl, such as methyl, and $R_4$ represents hydrogen.

Further compounds to be particularly highlighted are amines of formula I, wherein Ph represents a 2- or 3-mono-lower alkoxyphenyl radical, a di- or tri-lower alkoxyphenyl radical, wherein the lower alkyl parts are especially methoxy radicals, or a 2,3- or 3,4-methylenedioxyphenyl radical, wherein these phenyl radicals are optionally substituted by one or two free, mono- or di-lower alkylated amino groups, such as methylamino and dimethylamino groups, nitro groups, trifluoromethyl groups and especially fluorine, chlorine, or bromine atoms or lower alkyl radicals, especially methyl radicals, but are above all unsubstituted, or represents a a 4-mono-lower alkoxyphenyl radical displaying at least one more of the substituents mentioned, $R_1$, $R_2$ and $R_3$ have the above meanings, wherein $R_1$ especially represents an esterified or amidised carboxyl group but above all a free carboxyl group, and $R_2$ and $R_3$ each especially represent hydrogen or lower alkyl, such as methyl, and $R_4$ denotes a lower hydrocarbon radical of aliphatic character, especially a lower alkyl radical, such as methyl radical.

Further compounds to be particularly highlighted are amines of formula I, wherein Ph represents a mono-, di-or tri-lower alkoxyphenyl radical, wherein the lower alkyl parts display at least, and preferably, two C atoms, or represents a 2,3-methylenedioxyphenyl radical, wherein these phenyl radicals are optionally substituted by one or two free, mono- or di-lower alkylated amino groups, such as methylamino and dimethylamino groups, nitro groups, trifluoromethyl groups, and especially fluorine, chlorine or bromine atoms or lower alkyl radicals, especially methyl radicals, but are above all unsubstituted, $R_1$, $R_2$ and $R_3$ have the above meanings, wherein $R_1$ especially represents an esterified or amidised carboxyl group, but above all a free carboxyl group, and $R_2$ and $R_3$ each especially represent hydrogen or lower alkyl, such as methyl, and $R_4$ represents hydrogen.

Further compounds to be particularly highlighted are amines of formula I, wherein Ph represents a mono-, di- or tri-lower alkoxyphenyl radical, wherein the lower alkyl parts especially represent methoxy radicals, or represents a methylenedioxyphenyl radical, wherein these phenyl radicals are optionally substituted by one or two free, mono- or di-lower alkylated amino groups, such as methylamino and dimethylamino groups, nitro groups, trifluoromethyl groups and especially fluorine, chlorine or bromine atoms or lower alkyl radicals, especially methyl radicals, but are above all unsubstituted $R_1$ represents an esterified or amidised carboxyl group, $R_2$ and $R_3$ have the above meanings and especially each represent hydrogen or lower alkyl, such as methyl, and $R_4$ denotes hydrogen.

Compounds to be especially highlighted are amines of formula I, wherein Ph deontes a 2-, 3- or 4-chloro- or -bromo- or 2- or 4-fluoro-mono-lower alkoxyphenyl radical, a 2,3-, 2,4-, 2,5-, 2,6-, 3,4- or 3,5-dichloro- or -dibromo- or 2,3-, 2,4-, 2,5-, 2,6- or 3,4-difluoro-mono-lower alkoxy phenyl radical, and optionally mono- or di-fluoro-, -chloro- or -bromo-substituted 2,3-, 2,4-, 2,5-, 2,6- or 3,5-di-lower alkoxyphenyl radical, a 3,4-di-lower alkoxy-5- or 6- fluoro-, -chloro- or -bromo-phenyl radical, a 3,4-di-lower alkoxy-2-fluoro- or -bromo-phenyl radical, a difluoro-, dichloro- or di-bromo-substituted 3,4-di-lower alkoxyphenyl radical, an optionally mono- or di-fluoro-, -chloro- or -bromo-substituted tri-lower alkoxyphenyl radical, an optionally mono- or di-fluoro-, -chloro- or -bromo-substituted 2,3-methylenedioxyphenyl radical, a mono or di-fluoro-, -chloro- or -bromo-substituted 3,4-methylenedioxyphenyl radical or a mono- or di-lower alkyl substituted and optionally mono- or di-fluoro-, -chloro- or -bromo-substituted mono- or di-lower alkoxy- or methylenedioxy-phenyl radical, $R_1$ represents a free carboxyl group and $R_2$, $R_3$ and $R_4$ is hydrogen, with lower alkoxy radicals being especially methoxy radicals and lower alkyl radicals being especially methyl radicals.

Compounds of the formula IIIa

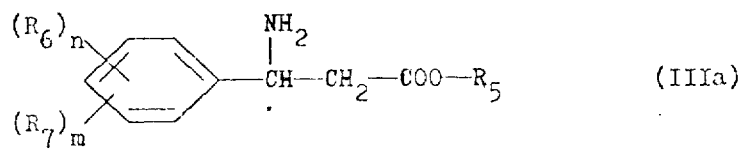

(IIIa)

wherein $R_5$ is lower alkyl, $R_6$ is lower alkoxy, $R_7$ is lower alkyl, n is 1 or 2, m is 0, 1 or 2 and radicals $R_6$ are bonded in the 3-, 4- and/or 5-position, are particularly suitable.

Amongst the compounds of the formula IIIa, those wherein $R_5$ is methyl, $R_6$ is methoxy, $R_7$ is methyl, n is 1 or 2, $m$ is 0 or 1 and radicals $R_6$ are bonded in the 3- and/or 4-position, should above all be singled out.

Compounds of formula IIIb

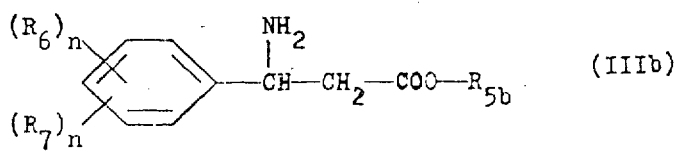

wherein $R_{5b}$ is hydrogen or lower alkyl, $R_6$ is lower alkoxy, $R_7$ is lower alkyl, $n$ is 1 or 2 and radicals $R_6$ are bonded in the 3-, 4- and/or 5-position, should also above all be singled out.

Of the compounds of formula IIIb, those wherein $R_{5b}$ is hydrogen or methyl, $R_6$ is methoxy, $R_7$ is methyl, and $n$ is 1 or 2, and radicals $R_6$ are bonded in the 3- and/or 4- position, should above all be singled out.

Compounds to be mentioned in particular are β-amino-β-(3-bromo-4-methoxy-phenyl)-propionic acid, β-amino-β-methyl-β-(3,4-dimethoxyphenyl)-propionic acid, β-amino-β-(3,4-dimethoxyphenyl)-propionic acid amide, (+)- and (−)-β-amino-β-(3,4-methylenedioxyphenyl)-propionic acid, β-amino-β-(3,4,5-trimethoxyphenyl)propionic acid, β-amino-β-(2,3-dimethoxyphenyl)-propionic acid, β-amino-β-methyl-β-(3,4,5-trimethoxyphenyl)-propionic acid, β-amino-β-(2,5-dimethoxy-phenyl)-propionic acid, β-amino-β-(3,4-diethoxyphenyl)-propionic acid, β-amino-β-(3,4-di-n-propoxyphenyl)-propionic acid, β-amino-β-(3-methoxy-4-ethoxyphenyl)-propionic acid and β-amino-β-(3-methoxy-4-allyloxyphenyl)-propionic acid. Compounds to be mentioned very particularly are β-amino-β-(3,4-dimethoxyphenyl)-propionic acid methyl ester, β-amino-β-(3,5-dimethoxyphenyl)-propionic acid, β-amino-β-(3-methyl-4-methoxyphenyl)-propionic acid, α-methyl-β-amino-β-(3,4-dimethoxy-phenyl)-propionic acid, (+)-β-amino-β-(3- and -(4-methoxyphenyl)-propionic acid and (−)-β-amino-β-(3- and -(4-methoxyphenyl)-propionic acid, which in animal experiments, for example on renal hypertonic rats and on renal hypertonic dogs, shown an excellent effect in lowering the blood pressure if they are subcutaneously or orally administered in doses of 10 to 300 mg/kg.

The new compounds are obtained according to methods which are in themselves known.

Thus the new compounds can for example be obtained by splitting off the radical $R_8$ in a compound of formula IV

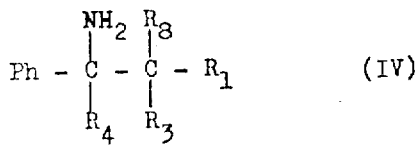

wherein Ph, $R_1$, $R_3$ and $R_4$ have the above meanings and $R_8$ denotes a radical which can be split off.

A radical $R_8$ which can be split off is for example an acyl radical, such as a free carboxyl group or a lower alkanoyl radical. The splitting off of a free carboxyl group can be performed in the customary manner by decarboxylation, for example by gentle warming or heating.

The splitting off of a lower alkanoyl radical, especially of an acetyl radical, can take place in the customary manner, such as is known for the splitting of β-keto-esters, especially by the action of strong bases, such as for example alkali hydroxide, for example sodium or potassium hydroxide, or alkali alcoholate, for example sodium ethylate, preferably at elevated temperature and in an inert solvent. This procedure is especially suitable for starting substances in which $R_1$ represents an esterified carboxyl group.

The new compounds can furthermore be obtained if in a compound of formula V

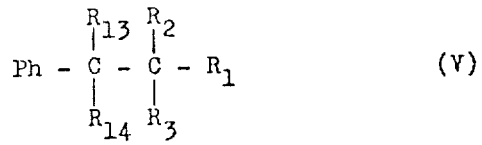

wherein Ph, $R_1$, $R_2$ and $R_3$ have the above meanings, $R_{14}$ represents $R_4$ and $R_{13}$ represents a radical which can be converted into the amino group, or $R_{13}$ and $R_{14}$ together represent a radical which can be converted into the amino group, or in a tautomer thereof, the radical $R_{13}$ or the radical jointly formed by $R_{13}$ and $R_{14}$ is converted into the amino group.

Such radicals $R_{13}$ or $R_{13}$ and $R_{14}$ are especially radicals which can be converted into the amino group by reduction or solvolysis.

Suitable radicals $R_{13}$ which can be converted into the amino group by reduction are especially monovalent radicals, of which the free valency starts from a nitrogen atom, and especially hydroxylamino groups, and radicals additionally linked to the carboxyl group $R_1$. Starting from optically active starting substances, optically active compounds are thus obtained.

Radicals of which the free valency starts from a nitrogen atom and which are additionally linked to the carboxyl group $R_1$ are, for example, radicals which together with the carbon atoms carrying the radical $R_{13}$ and the carboxyl group $R_1$ and with the radical $R_1$ form an isoxazolin-5-one or isoxazolidin-5-one ring. Starting from optically active isoxazolidin-5-ones, optically active compounds are thus obtained.

The reduction takes place in the customary manner. Thus the hydroxylamino group can for example be reduced by metallic reduction, for example with aluminum amalgam in a suitable solvent, such as water or especially moist ether or an alcohol, such as methanol and ethanol, or with iron in water and hydrochloric acid, or also by catalytically activated hydrogen, for example by hydrogen in the presence of a catalyst, such as Raney nickel, for example Raney nickel in an alcohol, such as ethanol. Hydroxylamino groups can furthermore be reduced by other reducing agents, such as hydroxylamine.

Radicals of which the free valency starts from a nitrogen atom and which are additionally linked to the carboxyl group $R_1$, especially the abovementioned isoxazolin-5-one and isoxazolidin-5-one rings, can for example be reduced by hydrogen in the presence of a catalyst, such as nickel, for example Raney nickel, palladium or platinum catalyst.

Monovalent radicals which can be converted by reduction and of which the free valency starts from a nitrogen atom, are furthermore, for example, amino groups which carry, a radical which can be split off by reduction, for example, an α-arylalkyl radical, such as a benzyl radical or an α-aralkoxycarbonyl radical, such as a benzyloxycarbonyl radical, as a substituent on the amino group. The reduction can be carried out in the customary manner, especially by hydrogenolysis, for example by hydrogen in the presence of a hydrogenation catalyst, for example palladium or platinum. Other suitable radicals of this nature are, further, for example amino groups which are for example substituted by a β-halogenoethoxycarbonyl radical, such as the 2,2,2-trichloroethoxycarbonyl radical, the 2,2,2-tribromoethoxycarbonyl radical, the 2-bromoethoxycarbonyl radical, or the 2-iodoethoxycarbonyl radical or by the benzoylmethoxycarbonyl radical. The reduction can take place in the customary manner, especially by metallic reduction (so-called nascent hydrogen). Nascent hydrogen can here be obtained by the action of metal or metal alloys on agents which yield hydrogen, such as carboxylic acids, alcohols or water, and in particular zinc or zinc alloys together with acetic acid can be used. The reduction of radicals containing β-halogenoethoxycarbonyl radicals can preferably take place by means of chromium-II compounds, such as chromium-II chloride or acetate. Starting from optically active starting substances, optically active compounds are thus obtained.

Suitable radicals $R_{13}$ and $R_{14}$ which can be converted into the amino group by reduction are especially divalent radicals of which the free valencies start from a nitrogen atom, such as hydroxyimino and imino radicals.

The reduction takes place in the customary manner, for example by means of complex metal hydrides, such as lithium or sodium borohydride, by means of hydrogen in the presence of a catalyst, such as platinum or Raney nickel, or also, in the case of hydroxyimino groups, by means of metallic reduction, such as with sodium in an alcohol, such as methanol and ethanol, or also by means of tin-II chloride in hydrochloric acid.

Hydorxyimino and imino compounds can also be in the form of their tautomers, if $R_4$ represents hydrogen and one of the radicals $R_2$ and $R_3$ represents hydrogen. Such tautomers for example have the formula VI or VII

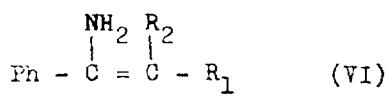

(VI)

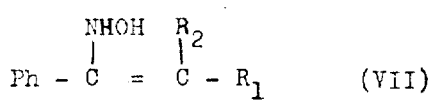

(VII)

wherein Ph, $R_1$ and $R_2$ have the above meanings.

Such tautomers can be reduced in the customary manner, such as by means of hydrogen in the presence of a catalyst, for example platinum or Raney nickel.

Suitable radicals $R_{13}$ which can be converted into the amino group by solvolysis are especially monovalent radicals which can be converted into the amino group by hydrolysis, ammonolysis or hydrazinolysis. Starting from optically active starting substances, optically active compounds are thus obtained.

Radicals which can be converted into the amino group by hydrolysis are, for example, acylated amino groups.

Acylated amino groups are for example those wherein the acyl radicals are oxycarbonyl radicals, such as alkoxycarbonyl radicals, for example tert.-butoxycarbonyl radicals, α-aralkoxycarbonyl radicals, for example carbobenzoxy radicals, and especially lower alkanoyl radicals or aryloyl radicals, for example acetyl radicals, benzoyl radicals or phthaloyl radicals.

The hydrolysis takes place in the customary manner by means of hydrolysing agents, especially in the presence of acid agents. Suitable acid agents are, for example, dilute inorganic acids, such as sulphuric acid or a hydrohalic acid, such as hydrochloric acid or hydrobromic acid. A tert.-butoxycarbonylamino radical can however also be converted into the amino group under anhydrous conditions, for example by treatment with a suitable acid, such as trifluoroacetic acid.

Radicals which can be converted into the amino group by ammonolysis are, for example, free and especially reactive esterified hydroxyl groups, such as hydroxyl group esterified with hydrochloric acid (a chlorine atom), or especially a hydroxyl group esterified with hydrobromic or hydriodic acid (a bromine or iodine atom respectively), or also an organic sulphonyloxy group, such as an aliphatic sulphonyloxy group, for example a methylsulphonyloxy, ethylsulphonyloxy or 2-hydroxy-ethylsulphonyloxy group, or an aromatic sulphonyloxy group, for example a p-toluenesulphonyloxy, p-bromobenzenesulphonyloxy or m- or p-nitrobenzenesulphonyloxy group. Reactive esterified hydroxyl groups are here also those which are intramolecularly esterified with the carboxyl group $R_1$, such as occur in appropriate 4-ring lactones.

The ammonolysis takes place in the customary manner, for example by treatment with ammonia, an agent which releases ammonia, for example urea or hexamethylenetetramine, or a metal amide, such as an alkali metal amide, for example lithium, sodium or potassium amide.

Radicals which can be converted into an amino group by hydrazinolysis are, for example, phthalimido radicals, which can be converted into the amino group in the customary manner, for example by treatment with hydrazine, optionally in the form of the hydrate.

The new compounds can furthermore be obtained if in a compound of the formula VIII

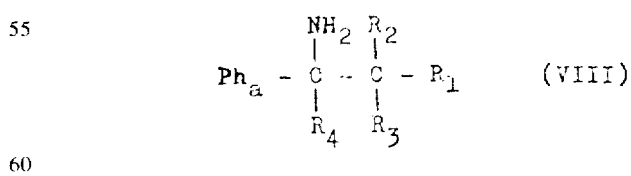

(VIII)

wherein $R_1$, $R_2$, $R_3$ and $R_4$ have the above meanings and $Ph_a$ represents a radical which can be converted into a phenyl radical Ph substituted by at least one aliphatically etherified hydroxyl group, $Ph_a$ is converted into such a radical. Starting from optically active starting substances, optically active compounds are thus obtained.

A radical $Ph_n$ which can be converted into a radical Ph is for example a phenyl radical which is optionally substituted as indicated above and which instead of aliphatically etherified hydroxyl groups, contains at least one free hydroxyl group. The conversion of such hydroxyphenyl radicals into phenyl radicals Ph is carried out in the customary manner, especially by reaction of the hydroxyphenyl radical with a reactively esterified alcohol, especially a lower alkanol or a diazo-lower alkane, such as diazomethane. Suitable reactively esterified alcohols are especially esterified as indicated above, for example with hydrohalic acids, such as hydrochloric and hydrobromic acid, or sulphuric acid. Di-lower alkyl esters of sulphuric acid, such as dimethylsulphate and diethylsulphate, are for example especially suitable. Here it is possible for free carboxyl groups to be simultaneously esterified, especially when using a diazo-lower alkane. A condensation agent, especially an alkaline condensation agent, such as an alkali or alkaline earth carbonate or bicarbonate, for example potassium carbonate or bicarbonate, is advantageously added in the case of the above reactions with a reactively esterified alcohol. A diazo-lower alkane is preferably used in a suitable solvent, such as ether, ethanol or benzene. Where appropriate, the amino group is protected in these reactions, especially as indicated below.

In resulting compounds, substituents can be introduced, modified or split off within the framework of the definition of the final substances.

Thus it is for example possible to convert radicals $R_1$ into one another in resulting compounds.

Esterified carboxyl groups and amidised carboxyl groups, that is to say carbamyl groups, can be converted into free carboxyl groups in the customary manner, for example by hydrolysis, preferably in the presence of strong bases or strong acids, for example those mentioned above. If desired, oxidising agents, such as nitrous acid, can be added during the hydrolysis of carbamyl groups.

Free or esterified carboxyl groups can also be converted into carbamyl groups in the customary manner, for example by reaction with ammonia or amines displaying at least one hydrogen atom on the nitrogen atom and, where required, dehydration of the ammonium salt produced as an intermediate. Thus it is for example possible to react free carboxyl groups with dimethylformamide in the presence of $P_2O_5$, preferably at elevated temperature.

Free carboxyl groups can be esterified in the customary manner, for example by reaction with an appropriate alcohol, advantageously in the presence of an acid, such as a mineral acid, for example sulphuric acid or hydrochloric acid, or in the presence of an acid-binding agent, such as dicyclohexylcarbodiimide, or by reaction with an appropriate diazo compound, for example a diazoalkane. The esterification can also be effected by reacting a salt of the acid, for example the sodium salt, with a reactively esterified alcohol, for example a halide, such as a chloride.

Free carboxyl groups can for example also be converted into acid halide or anhydride groupings in the customary manner, for example by reaction with halides of phosphorus or sulphur, such as thionyl chloride, phosphorus pentachloride or phosphorus tribromide, or with acid halides, such as chloroformic acid esters. The acid anhydride or halide groups can then be converted in the customary manner, by reaction with appropriate alcohols, if desired in the presence of acid-binding agents such as organic or inorganic bases, or with ammonia into esterified carboxyl groups or carbamyl groups, respectively.

It is furthermore possible, in resulting compounds wherein $R_2$ and/or $R_3$ denote hydrogen atoms, to introduce substituents $R_2$ or $R_3$. For example, it is possible to convert an appropriate compound, above all an ester or an amide, into the $\alpha$-metal salt, for example by reaction with strong bases, such as alkali metal amides, hydrides or hydrocarbon compounds, such as sodium amide or hydride or phenyllithium or butyl-lithium, and then to react this salt, preferably without isolation, with a reactive ester of an appropriate alcohol, for example an alcohol of the formula $R_2OH$ or $R_3OH$. Reactive esters are especially those with strong inorganic or organic acids, preferably with hydrohalic acids, such as hydrochloric, hydrobromic or hydriodic acid, with sulphuric acid or with arylsulphonic acid, such as benzenesulphonic, p-bromobenzenesulphonic or p-toluenesulphonic acid.

In resulting compounds which contain aliphatic C-C double bonds, these can be hydrogenated to give C-C single bonds, especially by means of hydrogen in the presence of a hydrogenation catalyst, for example nickel, platinum or palladium, such as Raney nickel, platinum black or palladium on active charcoal. If appropriate, the absorption of hydrogen is followed volumetrically and the hydrogenation is stopped after the calculated amount of hydrogen has been taken up.

The subsequent conversions can be carried out individually or in combination, and in optional sequence. In the individual operations, especially in reductions, care must be taken that other functional groups are not attacked.

The invention also relates to those embodiments of the process in which the process is stopped at any stage or in which one starts from a compound obtainable as an intermediate product at any stage and carries out the missing stages, or in which a starting substance is formed under the reaction conditions or is used in the form of a salt and/or racemate or optical antipode, where appropriate.

It is thus possible to react compounds of the formula $Ph-C(R_4)=O$ with ammonia or ammonium salts, for example ammonium acetate and malonic acid or a half-ester thereof or a malonic acid or half-ester substituted by $R_3$, whereby compounds of the formula IV, wherein $R_8$ represents the carboxyl group, are obtained as intermediate products and are then decarboxylated in accordance with the invention to compounds of formula I. Instead of compounds of formula $Ph-C(R_4)=O$ and, for example, ammonia, it is also possible to start from imino compounds of formula $Ph-C(R_4)=NH$ and to react these, as indicated, with malonic acid or a halfester which can be substituted by $R_3$.

Further, it is particularly appropriate to start from a compound of formula IX

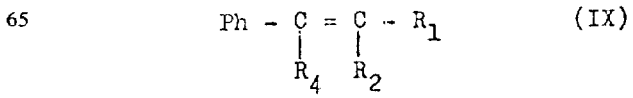

wherein Ph, $R_1$, $R_2$ and $R_4$ have the above meanings, and to react this with an excess of hydroxylamine, whereby compounds of formula V, wherein $R_{13}$ represents hydroxylamino, are obtained as intermediate products and are then reduced by hydroxylamine in accordance with the invention to compounds of formula I.

It is furthermore possible to react a compound of formula X

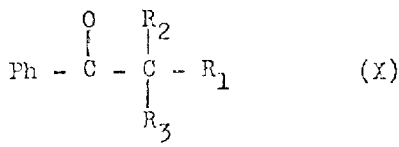

wherein Ph, $R_1$, $R_2$ and $R_3$ have the above meanings, with ammonia under reducing conditions, whereby a compound of formula V, wherein $R_{13}$ and $R_{14}$ together represent the imino group, is obtained as an intermediate product which is then reduced in accordance with the invention to the amino group.

The reactions mentioned are carried out in the customary manner, in the presence or absence of diluents, condensation agents and/or catalytic agents, at lowered, ordinary or elevated temperature and where appropriate in a closed vessel and/or under an inert gas atmosphere. If necessary, functional groups can be protected whilst performing one of the reactions mentioned. Thus, in particular, amino groups can be protected, for example by acylation, for example as phthalimido radicals, above all in oxidation reactions, whereupon the amino group is subsequently again liberated, especially as described above.

Depending on the number of the asymmetric C atoms and the choice of the starting substances and procedures, the compounds according to the invention can be in the form of isomer mixtures, of racemates, or, if desired or required, of optical antipodes.

Isomer mixtures can be separated into the pure racemates in a manner which is in itself known on the basis of the physico-chemical differences, for example by chromatography and/or fractional distillation.

The separation of resulting pure racemates into the optical antipodes can be carried out in a manner which is in itself known. Resulting racemates can, for example, be converted into salts, preferably into salts with optically active bases such as optically active α-phenylethylamine, α-(1-naphthyl)-ethylamine, quinine, cinchonidine or brucine, and also into acid addition salts with suitable optically active acids; the resulting mixtures of diastereoisomeric salts are separated into the individual salts on the basis of physicochemical differences, for example of solubility, crystallisability and the like, and the optically active antipodes are liberated from the salts. It is furthermore possible to react a resulting racemate, in the salt form, with an optically active metal complex salt or to react a resulting racemate, in the free form, with an optically active metal complex hydroxide, and to separate off the less soluble product and liberate the compound of formula I. Suitable optically active metal complexes are, for example, optically active cobalt nitrate complex compounds.

It is furthermore also possible to separate resulting racemates into the optically active antipodes by fractional crystallisation, optionally from an optically active solvent, or by chromatography, especially thin layer chromatography, on an optically active carrier material or with the aid of micro-organisms. Mixtures of diastereoisomeric compounds are separated into the pure isomeric compounds in the customary manner on the basis of their physico-chemical differences, such as differences in solubility, boiling points and the like, for example by fractional crystallisation or distillation. Herein, the pharmacologically more effective pure isomer, especially the more effective or less toxic optically active antipode, is advantageously isolated.

It is however also possible to precipitate the undesired antipode of the aminoacid as a salt, for example from a solution of the racemate by reaction with suitable optically active bases or acids, such as those mentioned above, to separate off this salt and to isolate the desired antipode from the mother liquor.

In the reactions mentioned, the absolute configuration does not change.

The starting substances are known or can be obtained according to methods which are in themselves known.

Thus it is possible to obtain starting substances of formula VII, wherein $R_{14}$ represents $R_4$ and $R_{13}$ is a monovalent radical which can be converted by reduction or solvolysis into the amino group, especially an α-arylalkylamino radical, an α-aralkoxycarbonylamino radical or a phthalimido radical, by rearranging a compound of the formula XI

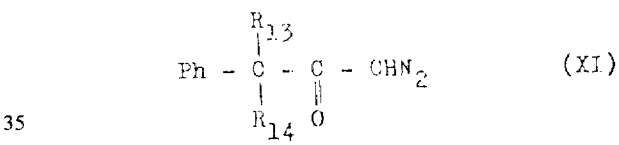

wherein Ph, $R_{13}$ and $R_{14}$ have the abovementioned meaning, whilst undergoing solvolysis. Starting from optically active starting substances, optically active compounds are thus obtained.

The rearrangement with solvolysis taking place is carried out in the customary manner, especially in the presence of metal catalysts, such as silver, above all colloidal silver. Possible solvolysis media are water, an alcohol or ammonia or an amine displaying at least one hydrogen, whereby free acids, esters or amides are respectively obtained. Suitable alcohols are especially lower alkanols, such as methanol and ethanol, and suitable amines are especially lower-alkylated amines. The rearrangement is especially carried out in accordance with the method described by Arndt-Eistert.

Appropriately, such starting substances are used for carrying out the reactions according to the invention as lead to the initially particularly mentioned groups of final substances and particularly to the final substances which have been specially described or highlighted.

Depending on the process conditions and starting substances, the final substances are obtained in the free form or in the form of their salts, which is also included in the invention.

Salts can be converted into the free compounds in a manner which is in itself known, acid addition salts for example by reaction with a basic agent, and salts with bases for example by reaction with acid agents; these exchange reactions can also be performed in ion exchangers (in the solid form on columns or in the liquid form by counter-current distribution).

On the other hand, resulting free compounds can form salts, preferably non-toxic pharmaceutically usable salts, with inorganic or organic acids or metal salts, such as alkali metal salts or alkaline earth metal salts, with ammonia or suitable amines (sic). In order to manufacture acid addition salts it is in particular possible to use inorganic acids, for example hydrohalic acids, such as hydrochloric acid or hydrobromic acid, perchloric acid, nitric acid or thiocyanic acid, sulphuric acids or phosphoric acids, or organic carboxylic or sulphonic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, hydroxymaleic acid, dihydroxymaleic acid, benzoic acid, phenylacetic acid, 4-amino-benzoic acid, 4-hydroxybenzoic acid, anthranilic acid, cinnamic acid, mandelic acid, salicylic acid, 4-amino-salicylic acid, 2-phenoxybenzoic acid, 2-acetoxy-benzoic acid, nicotinic acid, isonicotinic acid, embonic acid, methanesulphonic acid, ethanesulphonic acid, hydroxyethanesulphonic acid, benzenesulphonic acid, p-toluenesulphonic acid, naphthalenesulphonic acid, N-cyclohexyl-sulphamic acid or sulphanilic acid as well as ascorbic acid, and for the manufacture of salts with bases it is for example possible to use alkali metal, such as sodium or potassium-carbonates, hydrogen carbonates or hydroxides, or corresponding alkaline earth metal, such as calcium or magnesium compounds, or ammonia as well as amines, such as aliphatic amines, for example lower alkylamines, such as trimethylamine or triethylamine. Aluminium salts, for example salts of two mols of aminoacid (I) and one mol of aluminium hydroxide, are also suitable, especially because of their slower resorption, freedom from odour and the slight gastro-intestinal disturbances.

Salts, such as for example acid addition salts, with the abovementioned acids as well as with other acids, such as mineral acids or acid nitro compounds, can also be used for purification purposes, by separating salts from the reaction mixtures and obtaining the free compound from them. Because of the close relationships between the new compounds in the free form and in the form of their salts, the free compounds or the salts are, in the preceding and subsequent texts, where appropriate, also to be understood to include the corresponding salts or free compounds in general sense and in respect of purpose.

The invention also comprises pharmaceutical preparations containing an amine of formula I

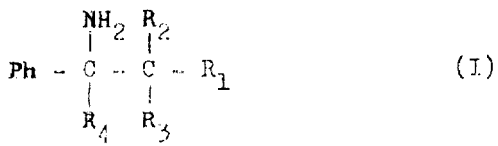

wherein Ph denotes a phenyl radical which is substituted by at least one aliphatically etherified hydroxyl group and optionally by amino groups, nitro groups, lower alkyl groups, trifluoromethyl groups and/or halogen atoms, for example one of the preferentially mentioned phenyl radicals, $R_1$ denotes an optionally esterified or amidised carboxyl group, for example one of those mentioned preferentially, and each of the radicals $R_2$, $R_3$ and $R_4$, which can be identical or different, denote a lower hydrocarbon radical of aliphatic character, such as especially methyl, or hydrogen, or containing one of the preferentially mentioned compounds, with the exception of DL-β-amino-β-(2-methoxyphenyl)-propionic acid, together with a pharmaceutical excipient. Suitable preparations which contain an ester, such as a lower alkyl ester, or an amide of β-amino-β-(3,4-dimethoxypehnyl)-propionic acid, in the racemic or optically active form, are also particularly suitable.

The present invention also comprises the treatment of hypertensive conditions by administration of compounds of formula I

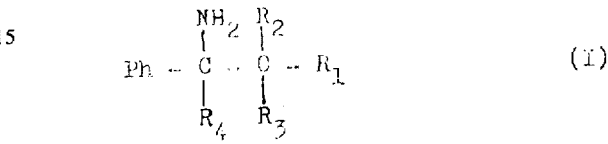

wherein Ph denotes a phenyl radical which is substituted by at least one aliphatically etherified hydroxyl group and optionally by amino groups, nitro groups, lower alkyl groups, trifluoromethyl groups and/or halogen atoms, $R_1$ denotes an optionally esterified or amidised carboxyl group, and each of the radicals $R_2$, $R_3$ and $R_4$, which can be identical or different, denote a lower hydrocarbon radical of aliphatic character or hydrogen, or one of the preferentially mentioned compounds, especially also of an ester or amide of β-amino-β-(3,4-dimethoxyphenyl)-propionic acid in the racemic or optically active form, in the form of pharmaceutical preparations; in this treatment, daily doses of about 0.5 g to about 5.0 g, preferably about 1.5 g to about 3 g, of the pharmacologically effective active substance are employed.

The new pharmaceutical preparations are manufactured in a manner which is in itself known, customarily by mixing the active substance with pharmaceutical, organic or inorganic, solid or liquid excipients which are suitable for enteral, for example oral, or parenteral administration. Possible excipients are those which do not react with the new compounds, such as for example water, gelatine, sugar, such as lactose or glucose, starches, such as wheat, corn or rice starch, stearic acid or salts thereof, such as calcium or magnesium stearate, talc, vegetable oils, benzyl alcohols, gum, polyalkylene glycols or other known medicinal excipients. The pharmaceutical preparations can optionally be sterilised and/or contain auxiliary substances, such as preservatives, stabilisers, wetting agents or emulsifiers, salts for regulating the osmotic pressure or buffers.

In addition to the abovementioned pharmacologically active compounds, the pharmaceutical preparations according to the invention can contain other therapeutically valuable substances, such as for example other anti-hypertensive agents, especially Rauwolfia alkaloids, such as reserpine, rescinnamine or deserpidine, and similar compounds, such as syrosingopine, veratrum alkaloids, such as germine or protoveratrine, or above all synthetic, anti-hypertensive and/or diuretically acting agents, such as chlorothiazide, hydrochlorothiazide, cyclopenthiazide or analogous compounds, 3-(3-sulphamyl-4-chlorophenyl)-3-hydroxy-isoindolin-1-one, hydralazine, dihydralazine, guanethidine or ganglion blocking agents, such as chloroisondamine.

The invention is described in more detail in the examples which follow.

EXAMPLE 1:

16.6 g of veratrum-aldehyde, 15 g of methylmalonic acid, 31 g of ammonium acetate and 60 g of acetic acid are well mixed and kept for 12 hours at 100°–105°C. After cooling the mixture is evaporated to dryness. The residue is dissolved in 100 ml of 2 N hydrochloric acid and the hydrochloric acid solution is extracted by shaking with ether. The aqueous phase is adjusted to pH = 6 with 2 N sodium hydroxide solution and evaporated. The residue is boiled up with 500 ml of absolute ethanol, and the alcohol solution is filtered and subsequently evaporated to half its volume. The material which has precipitated is filtered off and the filtrate is concentrated to about 100 ml. Hereupon crystals precipitate, which are filtered off. They are dissolved in as little absolute ethanol as possible and ethanolic hydrochloric acid is added until a strongly acid reaction is obtained. On addition of ether, crystallisation starts. α-M-ethyl-β-amino-β-(3,4-dimethoxyphenyl)-propionic acid hydrochloride of formula

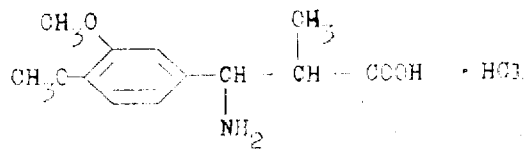

of melting point 240°–243°C is thus obtained.

EXAMPLE 2:

10.4 g of malonic acid, 16 g of ammonium acetate and 21.5 g of 3-bromo-4methoxy-benzaldehyde are heated for 4 hours in 25 ml of absolute ethanol under reflux, whilst stirring. After cooling, the crystals which have precipitated are filtered off and recrystallised from dimethylformamide-ether. β-Amino-β-(3-bromo-4-methoxyphenyl)-propionic acid of formula

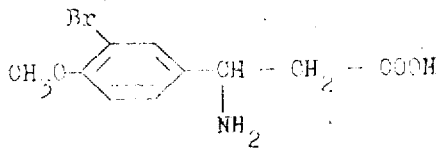

of melting point 224°–225°C is thus obtained.

EXAMPLE 3:

59.3 g of 3-methoxy-4-allyloxy-benzaldehyde, 32.1 g of malonic acid and 49.5 g of ammonium acetate in 75 ml of ethanol are warmed for 4 hours under a nitrogen atmosphere, whilst stirring under reflux. After cooling, the crystals which have precipitated are filtered off and washed with water and ethanol. The crystals thus obtained are treated with 2 N hydrochloric acid, the undissolved portion is separated off, and the filtrate is neutralised with 2 N sodium hydroxide solution. Hereupon β-amino-β-(3-methoxy-4-allyloxy-phenyl)-propionic acid of the formula

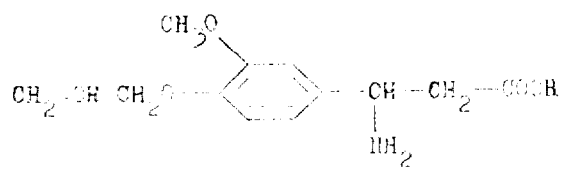

of melting point 223°–224°C precipitates.

33.3 g of this aminoacid are suspended in 500 ml of 95 percent strength ethanol and treated with 32 ml of 4.2 N ethanolic hydrochloric acid. A little undissolved matter is filtered off and the filtrate is treated with ether. Hereupon, the hydrochloride of β-amino-β-(3methoxy-4-allyloxy-phenyl)-propionic acid of melting point 190°–192°C crystallises out.

EXAMPLE 4:

36.2 g of 3-methyl-4-methoxy-benzaldehyde, 25.1 g of malonic acid and 38.6 g of ammonium acetate in 60 ml of absolute ethanol are heated for 4 hours under a nitrogen atmosphere, whilst stirring under reflux. After cooling to 0°C, the crystals which have precipitated are filtered off and washed with water and ethanol. The crystals thus obtained are treated with 130 ml of 1 N hydrochloric acid. A little undissolved matter is filtered off, the filtrate is evaporated to dryness, and the residue obtained is recrystallised from 95 percent ethanol with the addition of ether. The hydrochloride of β-amino-β-(3-methyl-4-methoxy-phenyl)-propionic acid of the formula

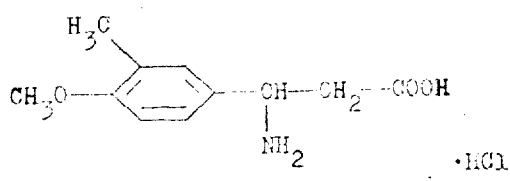

of melting point 198°–199°C is thus obtained.

EXAMPLE 5:

18 g of 3-methoxy-4-ethoxy-benzaldehyde, 10.4 g of malonic acid and 16 g of ammonium acetate in 25 ml of absolute ethanol are heated for 4 hours under a nitrogen atmosphere, whilst stirring under reflux. After cooling, the crystals which have precipitated are filtered off, rinsed with water and ethanol, and treated with 70 ml of 1 N hydrochloric acid. The small amount of undissolved matter is filtered off. The filtrate is evaporated to dryness in vacuo and the residue obtained is recrystallised from ethanol-ether. The hydrochloride of β-amino-β-(3-methoxy-4-ethoxy-phenyl)-propionic acid of the formula

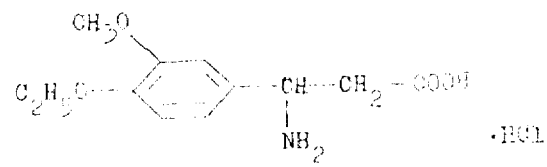

of melting point 213°–214°C is thus obtained.

EXAMPLE 6:

18.7 g of 3,4-di-n-propoxy-benzaldehyde, 13.5 g of ammonium acetate and 8.8 g of malonic acid in 25 ml of absolute ethanol are heated for 4 hours under a nitrogen atmosphere, whilst stirring under reflux. After cooling, the crystals which have precipitated are filtered off, washed with water and ethanol and dissolved in 200 ml of 2 N hydrochloric acid and 100 ml of ethanol. After filtering, the filtrate is neutralised with saturated sodium hydrogencarbonate solution, whereupon β-amino-β-(3,4-di-n-propoxy-phenyl)-propionic acid of the formula

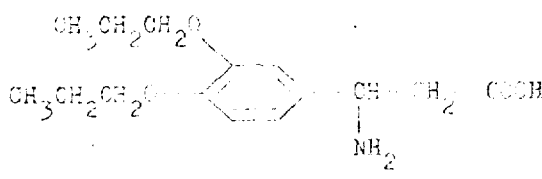

of melting point 229°–230°C precipitates.

EXAMPLE 7 :

19.4 g of 3,4-diethoxy-benzaldehyde, 16 g of ammonium acetate and 10.4 g of malonic acid in 25 ml of absolute ethanol are heated for 4 hours under a nitrogen atmosphere, whilst stirring under reflux. Ater completion of the reaction, the mixture is cooled, and the crystals which have precipitated are filtered off and washed with water and ethanol. The crystals thus obtained are treated with 1 N hydrochloric acid until they give a strongly acid reaction. Undissolved matter is filtered off, and the filtrate is neutralised with sodium hydrogencarbonate solution. Hereupon β-amino-β-(3,4-diethoxy-phenyl)-propionic acid of the formula

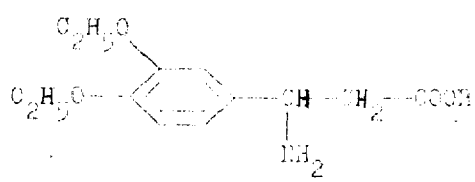

of melting point 240°–241°C precipitates.

EXAMPLE 8 :

16.6 g of 2,5-dimethoxy-benzaldehyde, 16 g of ammonium acetate and 10.4 g of malonic acid in 25 ml of absolute ethanol are heated for 4 hours under a nitrogen atmosphere, whilst stirring under reflux. After cooling, the crystals which have precipitated are filtered off and treated with 1 N hydrochloric acid until a strongly acid reaction is obtained, and insoluble matter is filtered off. The filtrate is evaporated to dryness and the residue is recrystallised from ethanol-ether. The hydrochloride of β-amino-β-(2,5-dimethoxy-phenyl)-propionic acid of the formula

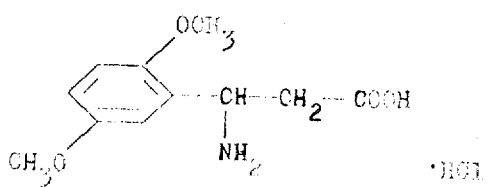

of melting point 200°–202°C (decomposition) is thus obtained.

EXAMPLE 9 :

16.6 g of 2,3-dimethoxy-benzaldehyde, 16 g of ammonium acetate and 10.4 g of malonic acid in 25 ml of absolute ethanol are heated for 4 hours under a nitrogen atmosphere, whilst stirring under reflux. After cooling, the crystals which have precipitated are filtered off and washed thoroughly with ethanol. The β-amino-β-(2,3-dimethoxy-phenyl)-propionic acid of the formula

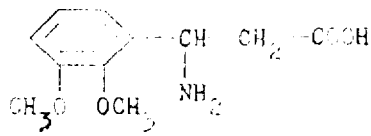

thus obtained melts at 217°–218°C (decomposition).

225 mg of the above acid are dissolved in 1 ml of 1 N hydrochloric acid. The solution is evaporated to dryness and the residue is recrystallised from ethanol-petroleum ether, whereupon the hydrochloride of β-amino-β-(2,3-dimethoxy-phenyl)-propionic acid of melting point 175°–177°C (decomposition) is obtained.

EXAMPLE 10 :

16.6 g. of 3,5-dimethoxy-benzaldehyde, 16 g of ammonium acetate and 10.4 g of malonic acid in 25 ml of absolute ethanol are heated for 4 hours under a nitrogen atmosphere, whilst stirring under reflux. After cooling, the mixture is diluted with 50 ml of absolute ethanol. After trituration, crystallisation starts. The crystals which have precipitated are filtered off. 9.1 g of the crystals thus obtained are treated with 40.4 ml of 1 N hydrochloric acid. The insoluble portion is filtered off and the filtrate is evaporated to dryness. The residue is dissolved in 120 ml of absolute ethanol and 1 ml of water. On adding ether, the hydrochloride of β-amino-β-(3,5-dimethoxy-phenyl)-propionic acid of the formula

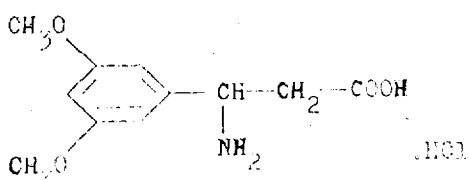

of melting point 217°–220°C (decomposition) crystallises.

EXAMPLE 11 :

19.6 g of 3,4,5-trimethoxy-benzaldehyde, 16 g of ammonium acetate and 10.4 g of malonic acid in 25 ml of absolute ethanol are heated for 4 hours under a nitrogen atmosphere, whilst stirring under reflux. After cooling, a further 25 ml of absolute ethanol are added and the mixture is stirred for 24 hours at 20°C. The crystals which have precipitated are filtered off and thoroughly washed with ethanol. β-Amino-β-(3,4,5-trimethoxy-phenyl)-propionic acid of the formula

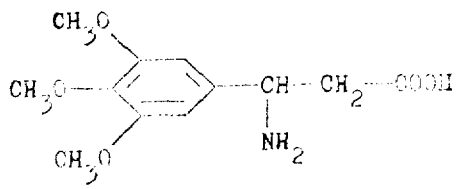

of melting point 214°–215°C (decomposition) is thus obtained.

255 mg of this aminoacid are dissolved in 1 ml of 1 N hydrochloric acid. The solution is evaporated to dryness and the residue is recrystallised from ethanol-ether. The hydrochloride of β-amino-β-(3,4,5-trimethoxy-phenyl)-propionic acid of melting point 214°–215°C is thus obtained.

EXAMPLE 12 :

7.4 g of hydroxylamine hydrochloride in 7 ml of water are added to a solution of 2.6 g of sodium in 70 ml of absolute ethanol. The sodium chloride which has precipitated is separated off and the filtrate is heated with 8.55 g of 2,4-dimethoxycinnamic acid for 7 hours under reflux, whilst stirring. After cooling, the ethanol is decanted. The crystals which remain are stirred with water and filtered off. β-Amino-β-(2,4-dimethoxyphenyl)-propionic acid of the formula

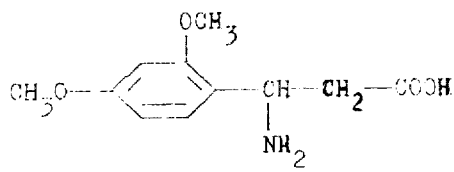

of melting point 226°–227°C (decomposition) is thus obtained.

2.1 g of this aminoacid are dissolved in 9.4 ml of 1 N hydrochloric acid. The solution is filtered and the filtrate is evaporated in vacuo. The residue is recrystallised from ethanol-ether. The hydrochloride of β-amino-β-(2,4-dimethoxy-phenyl)-propionic acid of melting point 189°–190°C (decomposition) is thus obtained.

EXAMPLE 13 :

30 g of β-amino-β-(3,4-dimethoxy-phenyl)-propionic acid and 500 ml of 11 N methanolic hydrochloric acid are heated for 60 minutes under reflux. The reaction solution is treated with active charcoal and filtered, and the filtrate is evaporated. The residue is recrystallised from methanol-ether. The hydrochloride of β-amino-β-(3,4-dimethoxy-phenyl)- propionic acid methyl ester of the formula

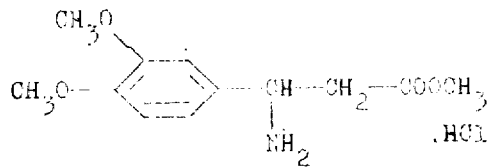

of melting point 183°–185°C (decomposition) is obtained.

EXAMPLE 14 :

2 g of β-amino-β-(3,4-dimethoxy-phenyl)-propionic acid methyl ester and 50 ml of a saturated solution of ammonia in methanol are heated for 12 hours to 50°C in a closed vessel. The reaction solution is evaporated in vacuo. The residue is treated with methylene chloride, insoluble matter is filtered off, and the filtrate is extensively concentrated. On adding ether, β-amino-β-(3,4-dimethoxy-phenyl)-propionic acid amide of the formula

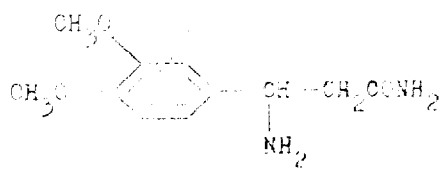

of melting point 97–98°C crystallises.

EXAMPLE 15 :

21 g of hydroxylamine hydrochloride are dissolved in 20 ml of water. A hot solution of 6.8 g of sodium in 200 ml of ethanol is added to this solution. The resulting suspension is cooled and filtered. The filtrate is heated with 20 g of β-methyl-3,4,5-trimethoxycinnamic acid for 20 hours under reflux. Thereafter, the reaction mixture is evaporated to dryness. The residue is dissolved in water and extracted with methylene chloride. The aqueous phase is concentrated. The residue is treated with 5 N hydrochloric acid, whereupon the hydrochloride of β-amino-β-methyl-β-(3,4,5-trimethoxyphenyl)-propionic acid of the formula

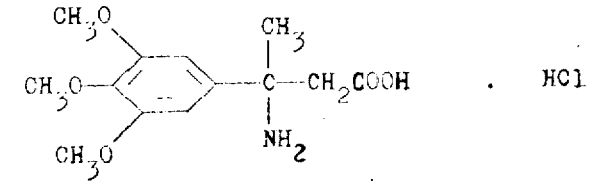

of melting point 226°–228°C (decomposition) precipitates.

Recrystallisation of the hydrochloride from 5 N hydrochloric acid raises the melting point to 237°–238°C (decomposition).

EXAMPLE 16 :

36 g of hydroxylamine hydrochloride are dissolved in 30 ml of water. This solution is treated with a hot solution of 11.7 g of sodium in 300 ml of ethanol. The resulting suspension is cooled and filtered. The filtrate is heated with 32 g of β-methyl-3,4-dimethoxycinnamic acid for 30 hours under reflux. The reaction mixture is then evaporated to dryness. The residue is suspended in methanol and heated for 3 hours under reflux whilst passing in hydrogen chloride. The reaction mixture is evaporated to dryness. The residue is taken up in water and extracted with ether. The aqueous phase is then rendered alkaline with 2 N sodium hydroxide solution and extracted with ether. The organic phase is dried and evaporated. The residue is dissolved in 150 ml of 1 N hydrochloric acid and heated for 3 hours under reflux. Thereafter, the reaction mixture is extracted with ether and the aqueous phase is evaporated to dryness. The residue is crystallised from methanol-isopropyl ether. The hydrochloride of β-amino-β-methyl-β-(3,4-dimethoxyphenyl)-propionic acid, thus obtained of the formula

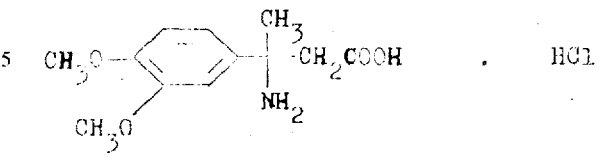

melts in the crude state at 197°-199°C (decomposition) and after recrystallisation from methanol-isopropyl ether melts at 198°-199°C (decomposition).

EXAMPLE 17:

Tablets containing 0.5 g of the active substance are manufactured as follows:

Composition (for 10,000 tablets):
| | |
|---|---|
| α-Methyl-β-amino-β-(3,4-dimethoxyphenyl)-propionic acid hydrochloride | 5000 g |
| lactose | 600 g |
| wheat starch | 200 g |
| colloidal silica | 200 g |
| micro-crystalline cellulose | 670 g |
| talc | 300 g |
| magnesium stearate | 30 g |

A mixture of the α-methyl-β-amino-β-(3,4-dimethoxyphenyl)-propionic acid hydrochloride, the lactose, the wheat starch and the colloidal silica is forced through a sieve and granulated using an ethanol-water mixture. The dried and sieved granules are homogeneously mixed with the microcrystalline cellulose, the talc and the magnesium stearate and the mixture is processed into tablets weighing 0.7 g, having a cross-shaped notch.

EXAMPLE 18:

Tablets containing 0.4 g of the active substance are manufactured as follows:

Composition (for 2,000 tablets):
| | |
|---|---|
| β-Amino-β-(3-methoxy-phenyl)-propionic acid | 800 g |
| lactose | 120 g |
| wheat starch | 40 g |
| colloidal silica | 40 g |
| micro-crystalline cellulose | 134 g |
| talc | 60 g |
| magnesium stearate | 6 g |

Tablets weighing 0.6 g are manufactured according to the process described in Example 17.

EXAMPLE 19:

Tablets containing 0.4 g of the active substance are manufactured as follows:

Composition (for 2,000 tablets):
| | |
|---|---|
| β-Amino-β-(3,4-dimethoxy-phenyl)-propionic acid methyl ester | 800 g |
| lactose | 120 g |
| wheat starch | 40 g |
| colloidal silica | 40 g |
| micro-crystalline cellulose | 134 g |
| talc | 60 g |
| magnesium stearate | 6 g |

Tablets weighing 0.6 g are manufactured according to the process described in Example 17.

EXAMPLE 20:

Tablets containing 0.4 g of the active substance are manufactured as follows:

Composition (for 2,000 tablets):
| | |
|---|---|
| β-Amino-β-(4-methoxy-phenyl)-propionic acid | 800 g |
| lactose | 120 g |
| wheat starch | 40 g |
| colloidal silica | 40 g |
| micro-crystalline cellulose | 134 g |
| talc | 60 g |
| magnesium stearate | 6 g |

Tablets weighing 0.6 g are manufactured according to the process described in Example 17.

EXAMPLE 21:

Tablets containing 0.4 g of the active substance are manufactured as follows:

Composition (for 2,000 tablets):
| | |
|---|---|
| β-Amino-β-(3,5-dimethoxy-phenyl)-propionic acid | 800 g |
| lactose | 120 g |
| wheat starch | 40 g |
| colloidal silica | 40 g |
| micro-crystalline cellulose | 134 g |
| talc | 60 g |
| magnesium stearate | 6 g |

Tablets weighing 0.6 g are manufactured according to the process described in Example 17.

EXAMPLE 22:

Tablets containing 0.4 g of the active substance are manufactured as follows:

Composition (for 2,000 tablets):
| | |
|---|---|
| β-Amino-β-(3-methyl-4-methoxyphenyl)-propionic acid | 800 g |
| lactose | 120 g |
| wheat starch | 40 g |
| colloidal silica | 40 g |
| micro-crystalline cellulose | 134 g |
| talc | 60 g |
| magnesium stearate | 6 g |

Tablets weighing 0.6 g are manufactured according to the process described in Example 17.

We claim:

1. A member selected from the group consisting of a compound of the formulae

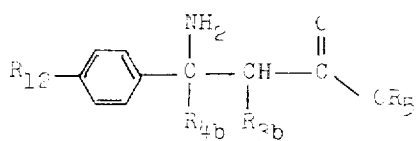

wherein $R_5$ is hydrogen or a lower alkyl group, each of the radicals $R_3$ and $R_4$ denotes hydrogen or a lower alkyl group and $R_6$ stands for lower alkoxy, n is 1, 2 or 3 and $R_7$ is a member selected from the group consisting of lower alkenyloxy and lower alkyl and, when n stands for 3 or when n stands for 2 and at least one of the symbols $R_3$, $R_4$ and $R_5$ stands for lower alkyl, hydrogen, $R_8$ and $R_9$ represent lower alkoxy groups standing in a position higher or lower than the 4-position, $R_{10}$ stands for lower alkoxy and $R_{5a}$ for a member selected from the group consisting of lower alkyl and, when $R_{10}$ contains at least two carbon atoms, hydrogen, $R_{11}$ stands for lower alkoxy and $R_{5b}$ for hydrogen or lower alkyl and one of the symbols $R_{3a}$ and $R_{5b}$ stands for hydrogen or lower alkyl and the other for a member selected from the group consisting of, lower alkyl and, when $R_{5b}$ stands for lower alkyl having more or less than 2 carbon atoms, hydrogen, $R_{12}$ stands for lower alkoxy, $R_{4b}$ for hydrogen or lower alkyl and $R_{3b}$ stands for a member selected from the group consisting of lower alkyl and, when $R_{12}$ contains more than 2 carbon atoms, hydrogen, and a non-toxic pharmaceutically usable salt thereof.

2. A compound as claimed in claim 1, wherein $R_3$ and $R_4$ are hydrogen, $R_5$ is lower alkyl, $R_6$ is lower alkoxy, $R_7$ is hydrogen or lower alkyl, n is 1 or 2, and radicals $R_6$ are bonded in the 2-, 4- and/or 5-position.

3. A compound as claimed in claim 1, wherein $R_3$ and $R_4$ are hydrogen, $R_5$ is methyl, $R_6$ is methoxy, $R_7$ is hydrogen or methyl, n is 1 or 2, and radicals $r_6$ are bonded in the 2- and/or 4-position.

4. A compound as claimed in claim 1, wherein $R_3$ and $R_4$ are hydrogen, $R_5$ is hydrogen or lower alkyl, $R_6$ is lower alkoxy, $R_7$ is lower alkyl, n is 1 or 2, and radicals $R_6$ are bonded in the 2-, 4- and/or 5-position.

5. A compound as claimed in claim 1, wherein $R_3$ and $R_4$ are hydrogen, $R_5$ is hydrogen or methyl, $R_6$ is methoxy, $R_7$ is methyl, and n is 1 or 2, and radicals $R_6$ are bonded in the 2- and/or 4-position.

6. A compound as claimed in claim 1, being α-methyl-1-β-amino-β-(3,4-dimethoxy-phenyl)-propionic acid, (+)-β-amino-β-(3- or -(4-methoxyphenyl)-propionic acid, (-)-β-amino-β-(3- or -(4-methoxyphenyl)-propionic acid, β-amino-β-methyl-β-(3,4-dimethoxyphenyl)-propionic acid, β-amino-β-(3,4,5-trimethoxyphenyl)-propionic acid, β-amino-β-(2,3-dimethoxyphenyl)-propionic acid, β-aminoβ-methyl-β-(3,4,5-trimethoxyphenyl)-propionic acid, β-amino-β-(2,5-dimethoxyphenyl)-propionic acid, β-amino-β-(3,4-diethoxyphenyl)-propionic acid, β-amino-β-(3,4-di-n-propoxyphenyl)-propionic acid, β-amino-β-(3-methoxy-4-ethoxyphenyl)-propionic acid and β-amino-β-(3-methoxy-4-allyloxyphenyl)-propionic acid, β-amino-β-(3,4-dimethoxyphenyl)-propionic acid methyl ester, β-amino-β-(3,5-dimethoxyphenyl)-propionic acid or β-amino-β-(3-methyl-4-methoxyphenyl)-propionic acid, or a non-toxic usable salt thereof.

7. A compound as claimed in claim 1, in the form of the antipodes or diastereomers thereof.

* * * * *